United States Patent Office 3,502,680
Patented Mar. 24, 1970

3,502,680
4[2' - (BIS - HYDROXYMETHYLMETHOXY CARBONYL) - PHENYLAMINO] - 7 OR 8-CHLOROQUINOLINES
André Allais, Les Lilas, and Pierre Girault, Paris, France, assignors to Roussel-UCLAF, Paris, France, a corporation of France
No Drawing. Filed Mar. 10, 1967, Ser. No. 622,042
Claims priority, application France, Mar. 17, 1966, 53,869
The portion of the term of the patent subsequent to Feb. 1, 1983, has been disclaimed
Int. Cl. C07d 33/52
U.S. Cl. 260—287                3 Claims

ABSTRACT OF THE DISCLOSURE

4[2'-(bis-hydroxymethylmethoxy carbonyl) - phenylamino]-7 or 8-chloroquinolines and acid addition salts thereof having analgesic and anti-inflammatory activity and their preparation.

OBJECTS OF THE INVENTION

It is an object of the invention to provide the novel compounds 4-[2'-(bis-hydroxymethyl-methoxy carbonyl)-phenylamino]-7 or 8-chloroquinoline and their non-toxic, pharmaceutically acceptable acid addition salts thereof.

It is another object of the invention to provide a novel process for the preparation of 4-[2'-(bis-hydroxymethyl-methoxycarbonyl)-phenylamino]-7 or 8-chloroquinolines and their non-toxic, pharmaceutically acceptable acid addition salts.

It is a further object of the invention to provide novel analgesic and anti-inflammatory compositions.

It is an additional object of the invention to provide a novel method of relieving inflammation and pain in warm-blooded animals.

These and other objects and advantages of the invention will become obvious from the following detailed description.

THE INVENTION

The novel products of the invention are selected from the group consisting of 4-[2'-(bis-hydroxymethylmethoxy-carbonyl)-phenylamino]-chloroquinolines of the formula

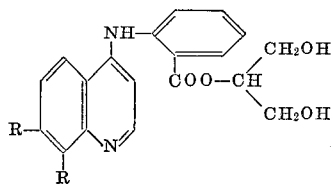

wherein one R is hydrogen and the other R is chlorine and their non-toxic, pharmaceutically acceptable acid addition salts.

Examples of suitable acids for the acid addition salts are inorganic acids such as hydrochloric acid, sulfuric acid, nitric acid, phosphoric acid, etc., and organic acids such as acetic acid, tartaric acid, benzylic acid, citric acid, maleic acid, malonic acid, fumaric acid, etc.

The novel compounds of the invention possess interesting pharmacological properties, particularly a significant analgesic activity and a pronounced anti-inflammatory activity while being completely devoid of any toxicity or any habit-forming effect. They do not cause any allergic reactions like derivatives of salicylic acid. They do not bring about any gastric or nervous disorders, or cause modifications in blood pressure, such as that caused by phenylbutazone or phenacetine derivatives. Finally, with regard to the difference from propoxyphen, they cause neither disorders of the central nervous system nor digestive disorders. Increased doses of the compounds of the invention do not entrain mental confusion nor respiratory disturbances. Therefore, they cannot be utilized for any non-therapeutic purposes. Lastly, a repeated administration of the said products does not cause any toxicity by accumulation.

The novel process of the invention comprises trans-esterifying 4-(2'-methoxycarbonylphenylamino)-chloroquinoline wherein the chlorine is in a position selected from the group consisting of 7- and 8- with a 2-R'-5-hydroxy-1,3-dioxane wherein R' is selected from the group consisting of lower alkyl and aryl in the presence of a strong alkaline agent to form a cyclic ketal and hydrolyzing the latter under acidic conditions to form the corresponding 4-[2'-(bis-hydroxymethyl - methoxycarbonyl)-phenylamino]-chloroquinoline which may be converted into its acid addition salt by reaction with an organic or inorganic acid. The intermediate cyclic ketal need not be isolated which is an advantage of the process.

Preferably the 2-R'-5-hydroxy-1,3-dioxane is 2-phenyl-5-hydroxy-1,3-dioxane and the strong alkaline agent is selected from the group consisting of alkali metals such as sodium or potassium, alkali metal amides and alkali metal hydrides such as sodium hydride. The acid hydrolysis is preferably effected with a strong mineral acid such as hydrochloric acid.

The analgesic and anti-inflammatory compositions of the invention are comprised of at least one compound selected from the group consisting of 4-[2'-(bis-hydroxymethylmethoxycarbonyl) - phenylamino]chloroquinolines of the formula

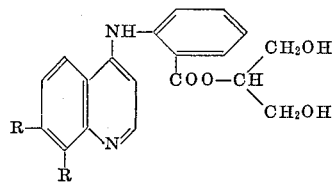

wherein one R is hydrogen and the other R is chlorine and their non-toxic, pharmaceutically acceptable acid addition salts, and a major amount of a pharmaceutical carrier. The compositions may be prepared in the form of injectable solutions or suspensions put up in ampoules and multiple dose flacons and in tablets, in coated tablets, in capsules and in suppositories according to known methods.

The said compositions are useful for the treatment of various pains as well as for certain inflammatory illnesses; muscular, articular or nervous algias; toothaches; rheumatic ailments, zona, migraines, febrile and infectious conditions.

The novel method of the invention of relieving pain and inflammatory conditions in warm-blooded animals comprises administering to warm-blooded animals an effective amount of at least one compound selected from the group consisting of 4-[2'-(bis-hydroxymethylmethoxy-carbonyl)-phenylamino]-chloroquinolines of the formula

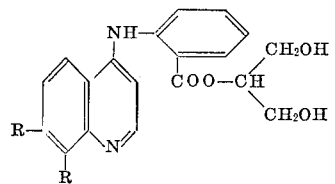

wherein one R is hydrogen and the other R is chlorine and their non-toxic, pharmaceutically acceptable acid addition salts.

The said compounds may be administered orally, transcutaneously or rectally. The usual useful dosage is between 3.5 to 35 mg./kg. depending upon the method of administration.

In the following example there is described a preferred embodiment to illustrate the invention. However, it should be understood that the invention is not intended to be limited to the specific embodiment.

EXAMPLE

Preparation of 4-[2'-(bis-hydroxymethylmethoxycarbonyl)-phenylamino]-7-chloro-quinoline 90 gm. of 2-phenyl-5-hydroxy-1,3-dioxane were heated to 85° C. under an atmosphere of nitrogen and after 390 mg. of sodium amide were added thereto, the mixture was maintained for 45 minutes at a temperature of 90–95° C. still under the atmosphere of nitrogen. Then the temperature of the reaction mixture was reduced to 85° C. and 39 gm. of 4-(2'-methoxycarbonylphenylamino)-7-chloroquinoline were added. Then the reaction mixture was heated at 90–95° C. for 5 hours after which time the reaction mixture was brought to a temperature of 20° C. Then the mixture was poured into a mixture of 900 cc. of water and 150 cc. of methylene chloride, agitated and filtered. The methylenechloride phase was decanted, washed with water and distilled to dryness. The residue was taken up with 90 cc. of water at a temperature of 95° C. and then 18 cc. of hydrochloric acid were added to the reaction mixture, which was then agitated for 15 minutes at 95° C. and allowed to stand overnight. 30 cc. of ammonia were added under agitation. The precipitate formed was triturated in ether, filtered, washed and crystallized from chloroform to obtain 17 gm. of raw product, which was recrystallized from refluxing isopropyl ether to obtain 16.5 gm. of 4-[2'-(bis-hydroxymethylmethoxycarbonyl)-phenylamino]-7-chloro-quinoline having a melting point of 166–167° C.

The said product was very soluble in acetone, slightly soluble in methanol and insoluble in water and ether.

Analysis.—$C_{19}H_{17}O_4N_2Cl$; molecular weight=372.81. Calculated (percent): C, 61.21; H, 4.59; N, 7.51; Cl, 9.51. Found (percent): C, 60.9; H, 4.9; N, 7.5; Cl, 9.7.

This compound is not described in the literature.

4 - [2' - (bis-hydroxymethylmethoxycarbonyl) - phenylamino]-8-chloro-quinoline was obtained in the same manner starting from 4-(2'-methoxycarbonyl-phenyl amino)-8-chloroquinoline.

PHARMACOLOGICAL STUDY (A) Analgesic activity

The analgesic activity was determined by the test procedure of Koster et al., (Fed. Proc., vol. 18, p. 412, 1959), in which intraperitoneal injections of acetic acid caused repeatedly characteristic movements of twisting and stretching in mice for more than 6 hours which is considered as the exteriorization of a diffuse aodominal pain and compounds preventing or suppressing this symptom are considered analgesics. A 6% acetic acid solution in water admixed with 10% of gum arabic was used. The dose provoking the syndrome under these conditions was 0.01 cc./gm. or 60 mg./kg. of acetic acid. The analgesics were administered orally ½ hour prior to the intra-peritoneal injection of acetic acid, the mice having been without food since the day before the start of the experiment. For each dose and for the controls which were used for each test, a group of 5 animals was used. The movements of stretching were observed, recorded and counted for each animal, then totaled for each group of 5 animals. The duration of the observation lasted 15 minutes and was started immediately after the injection of the acetic acid solution. The studied products were administered in the form of an aqueous suspension. Under the said test conditions, the 50% active dose, (DA50) of 4-[2'-(bishydroxymethylmethoxycarbonyl) - phenylamino] - 7 - chloro-quinoline was about 60 mg./kg. In this test, the DA50 of acetylsalicylic acid was 165 mg./kg.

(B) Anti-inflammatory activity

The test employed was that of Branceni et al., slightly modified, (Arch. Int. Pharmacodym., 1964, vol. 152, p. 15). It consisted of administering to rats weighing 160–170 gm. each, in one single injection, 500γ of naphthoyl-heparamine, into the fibrous bottom of a hind paw, which produces the development of an inflammatory edema. The products under study were orally administered in the form of an aqueous suspension one hour prior to the said injection. The maximum circumference of the hind paw was measured directly before and again 2 hours after the said injection. The difference in millimeters between the measurements after 2 hours and the initial measurement were used to estimate the extent of the inflammation measured on the control animals. The following results were obtained:

TEST COMPOUND.—4-[2'-(BIS-HYDROXY-METHYLMETHOXYCARBONYL)-PHENYLAMINO]-7-CHLORO-QUINOLINE

| Dose in mg./kg. | 10 | 20 | 50 | 100 |
|---|---|---|---|---|
| Percent edema at 2nd hour | 60 | 44 | 33 | 22 |

It was ascertained that the average active dose, the one which reduced the inflammatory reaction by 40%, (DA40), of 4-[2'-(bis-hydroxymethylmethoxycarbonyl)-phenylamino]-7-chloro-quinoline was about 10 mg./kg. Under the same conditions, the average active dose of phenylbutazone was from 10–15 mg./kg. and that of acetylsalicyclic acid was about 100 mg./kg.

We claim:

1. A compound selected from the group consisting of 4 - [2' - (bis-hydroxymethylmethoxycarbonyl)-phenylamino]chloro-quinolines of the formula

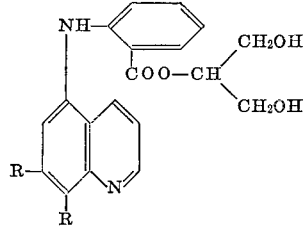

wherein one R is hydrogen and the other R is chlorine and their non-toxic, pharmaceutically acceptable acid addition salts.

2. A compound of claim 1 wherein the chlorine is in the 7-position.

3. A compound of claim 1 wherein the chlorine is in the 8-position.

References Cited

UNITED STATES PATENTS 3,151,026   9/1964   Allais et al. _____ 260—287
3,232,944   1/1966   Allais et al. _____ 260—287

DONALD G. DAUS, Primary Examiner

U.S. Cl. X.R.

260—286, 340.7; 424—258, 230